US006619403B2

(12) United States Patent
Coulombe

(10) Patent No.: US 6,619,403 B2
(45) Date of Patent: Sep. 16, 2003

(54) GRIPPING DEVICE AND METHOD FOR PROTECTING THE HOOF OF A HORSE FROM CONCUSSIVE FORCES

(76) Inventor: Robert W. Coulombe, 1377 Ridge Road N., Ridgeway, Ontario (CA), L0S 1N0

( * ) Notice: Subject to any disclaimer, the term of this patent is extended or adjusted under 35 U.S.C. 154(b) by 0 days.

(21) Appl. No.: 10/052,938

(22) Filed: Jan. 23, 2002

(65) Prior Publication Data

US 2003/0136564 A1 Jul. 24, 2003

(51) Int. Cl.7 ................................................. A01L 7/02
(52) U.S. Cl. ........................................... 168/14; 168/28
(58) Field of Search ........................... 168/14, 28

(56) References Cited

U.S. PATENT DOCUMENTS

| | | | | |
|---|---|---|---|---|
| 698,904 A | * | 4/1902 | Christopher | 168/28 |
| 777,022 A | * | 12/1904 | Howell | 168/14 |
| 779,148 A | * | 1/1905 | Abbott | 168/28 |
| 989,469 A | * | 4/1911 | Zeller | 168/28 |
| 1,349,888 A | * | 8/1920 | Kenny | 168/14 |
| 4,899,824 A | * | 2/1990 | Techer et al. | 168/14 |

* cited by examiner

Primary Examiner—Robert P. Swiatek
(74) Attorney, Agent, or Firm—Arnold S. Weintraub, Esq.

(57) ABSTRACT

A gripping device for a horse's hoof to provide improved grip to the surface on which the hoof contacts, and a method therefor. The gripping device comprises an elastomeric or polymeric material integrally molded to a gripping plate whereby to form a pad and a surface gripping section that extends upwardly from the plate and in part above the pad. The gripping device spreads shock and concussive forces evenly through the device, distributing pressure over the entire surface of the hoof. The present device provides traction protection and has therapeutic shoeing applications. The present device may be used in conjunction with a hospital plate which overlies an injury to the hoof wherein the elastomeric or polymeric material is cut out at the wound and overlies same, the hospital plate fitting into the cut out portion.

23 Claims, 3 Drawing Sheets

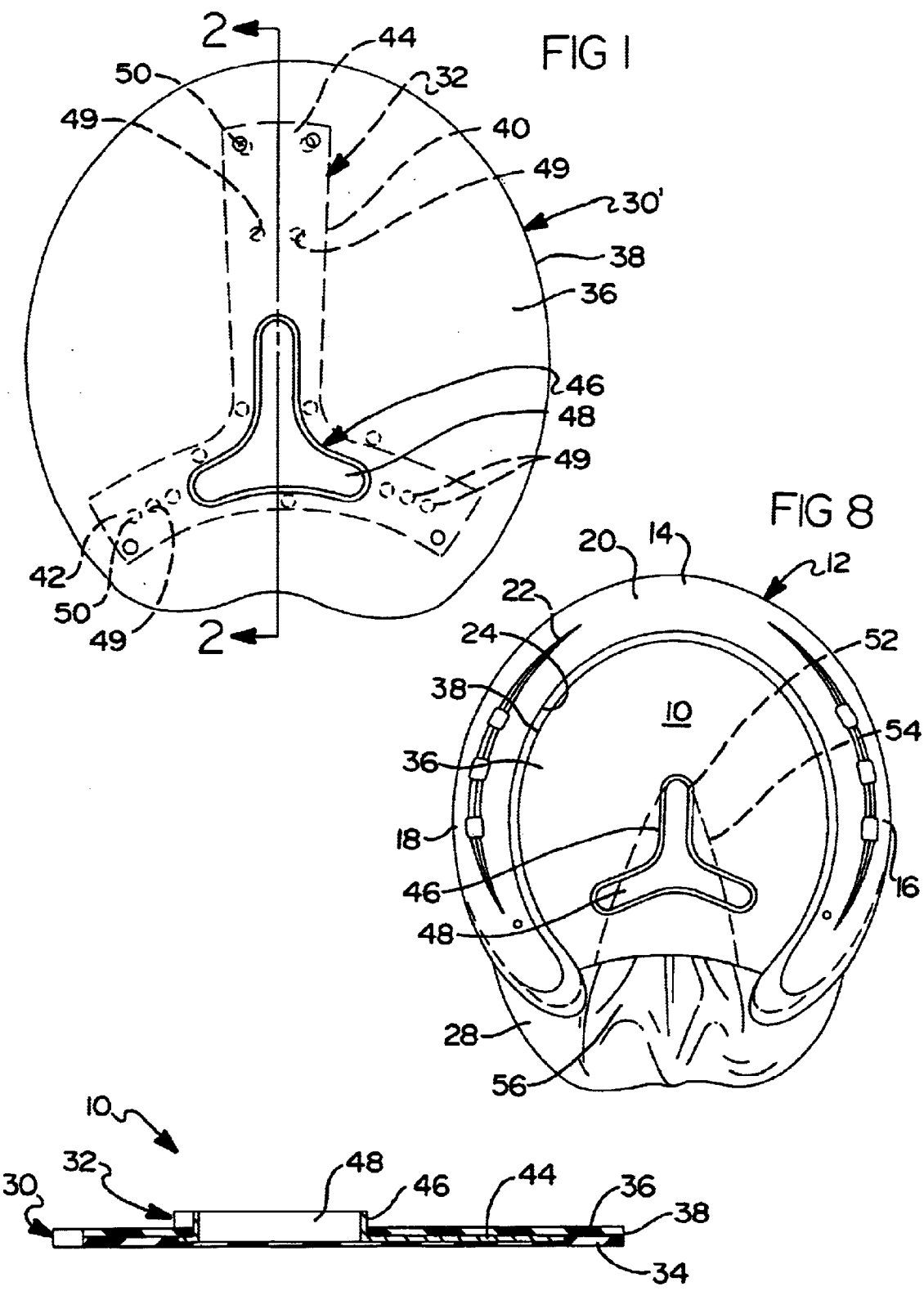

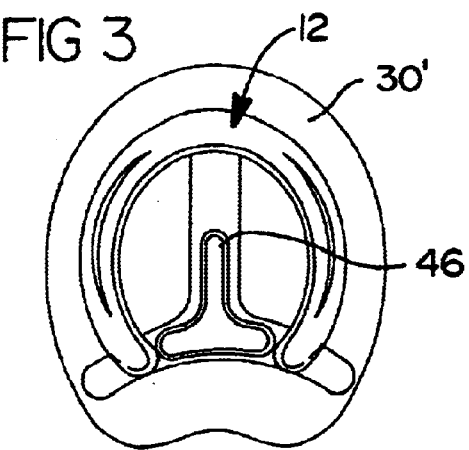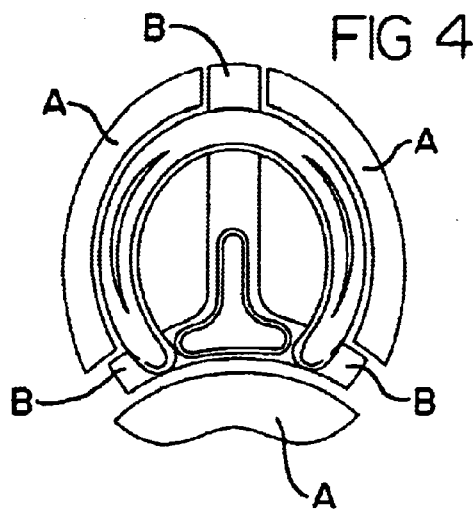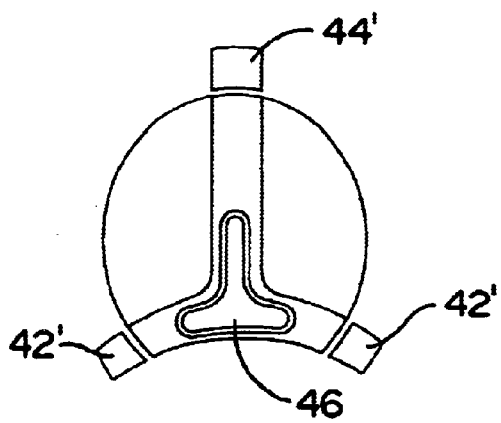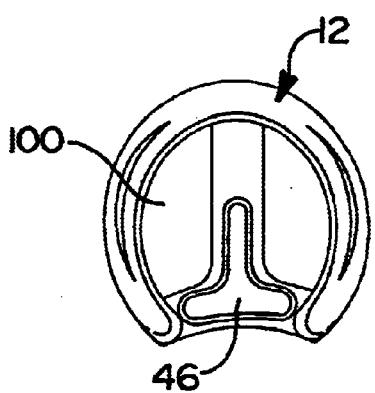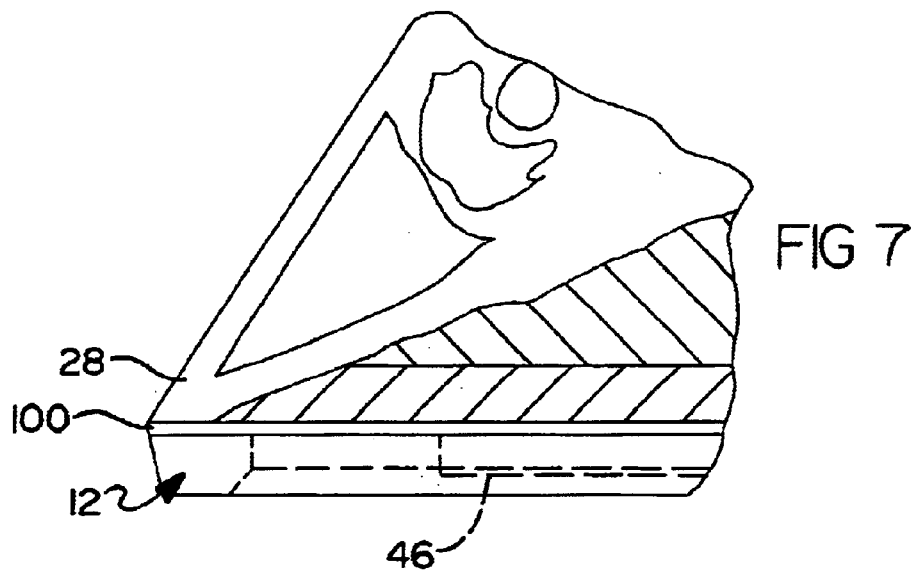

GRIPPING DEVICE AND METHOD FOR PROTECTING THE HOOF OF A HORSE FROM CONCUSSIVE FORCES

BACKGROUND OF THE INVENTION

1. Field of the Invention

This invention relates to a gripping device for a horse's hoof and used in conjunction with the conventional horseshoe to provide improved grip to the surface on which the hoof contacts, and a method for protecting the hoof of a horse. More particularly, the invention relates to an elastomeric pad provided with a raised gripping (or traction) element to simultaneously spread shock and concussive forces evenly through the device thereby distributing pressure over the horse's hoof while improving traction between the horse's hoof and the contacting surface.

2. Description of Related Art

Horseshoes come in a variety of sizes and shapes depending on the type of horse and activity for which the horse is to be engaged. Generally horseshoes are U-shaped and conform to the circumference of the hoof with two branches emanating from the toe area and projecting beyond the heel. Typically, the horseshoe is nailed to the hoof. Every three to five weeks due to the growth of the horse's hoof, the shoe is removed and the hoof trimmed. The shoe can be reused or reset each time until it is worn out. Although iron or metal horseshoes offer protection to the horse's foot, they offer little or no absorption of shock and concussion when the horse moves, especially when carrying a rider. Furthermore, metal shoes wear smooth and provide little traction on many surfaces.

In recent years horseshoes of various plastics and elastomers have been tried. Although they increase the absorption of shock and concussion, they fail to offer proper protection to the horse's hoof because of their lack of stiffness, shapeability and durability. Typically, the better the particular material performs as a shock absorber, the worse its wear characteristics. Further, these shoes have typically wear smooth and as a result traction or grip is lost.

A suitable gripping device which improves the grip between the horse's hoof and the contacting surface and spreading shock over the hoof is disclosed in U.S. Pat. No. 5,636,695, issued Jun. 10, 1997 to Watson, Jr., et al, the specification of which is specifically incorporated herein by reference. While this gripping device is suitable, it has been found that further protection to the horse's hoof from concussive and shock forces would be desirable. Protecting a horse's hoof from physical shock and concussive forces is an important factor with respect to horse involved in racing and other competitive activities.

SUMMARY OF THE INVENTION

In accordance with the present invention, there is provided a gripping device for horses which improves the grip or traction between a horse's hoof and the contacting surface, spreads the shock evenly upon striking the contacting surface, distributes pressure over the entire surface of the hoof, and provides traction for the horse on the inside of the horseshoe.

In accordance with a preferred embodiment of this invention there is provided a gripping device for use in conjunction with a generally U-shaped horseshoe, the gripping device including a generally planar elastomeric shock absorbing pad adapted to spread the shock evenly upon striking the contacting surface and distributing the pressure over the entire surface of the hoof, and a gripping or traction element for improving the grip between a horse's hoof and the contacting surface. The pad has a top surface which faces toward and is secured to the horse's hoof, a bottom surface opposite the top surface, and an outer periphery having a shape that conforms, at least in part, to the curvilinear shape of the horseshoe. The gripping or traction element comprises a metal plate preformed to include a raised T-shaped section extending upwardly from the center of the plate. The plate is, preferably, embedded interiorly of the pad and the raised T-shaped section projects, at least in part, above the bottom surface of the pad to improve traction.

In accordance with one preferred embodiment, the pad is formed to include an outer periphery of predetermined shape that enables it to fit within and be bounded within an interior wall of the horseshoe, whereupon the pad with its inlaid traction element is secured to the bottom surface of the horse's hoof.

In accordance with another preferred embodiment, the pad is formed to include an outer periphery of predetermined shape that substantially coextensive with and is bounded by the exterior wall of the horseshoe, whereupon the pad with its traction element is secured to the bottom surface of the horse's hoof and is disposed between the bottom surface of the horse's hoof and the top surface of the horseshoe.

Advantageously, the gripping device disclosed herein protects the horse's foot and inhibits stone bruising.

The gripping device prevents irregular objects from penetrating the frog and sole of the hoof ensuring protection and enhancing hoof integrity.

The traction portion in the center of the gripping device does not protrude past the contacting surface of the horseshoe. When the horseshoe penetrates the ground surface (e. g., ⅛ to 3/16 inch) the traction device comes into contact with the ground, reducing the chance of slipping. Desirably, the traction element can be altered by grinding it to the desired height.

The gripping device is desirably lightweight, provides support, and when worn as a preventative application in training and sporting events, will protect the horse's feet.

The traction element stimulates circulation. When the traction element fills with dirt it applies even force on the elastomeric material of the pad, transmitting equal force to the horse's frog, stimulating circulation and promoting heeling, while the inlaid metal plate and elastomeric material support and protect injured areas.

For a more complete understanding of the present invention, reference is made to the following detailed description and accompanying drawings. In the drawings, like reference characters refer to like parts throughout the several views, in which:

BRIEF DESCRIPTION OF THE DRAWINGS

FIG. 1 is a plan view of a pad from which a gripping device according to the present invention is formed;

FIG. 2 is an elevation view, in section, of the gripping device taken along line 2—2 of FIG. 1;

FIGS. 3–6 show the steps in forming a gripping device according to this invention;

FIG. 7 shows the gripping device of FIG. 6 mounted to a horse's hoof;

FIG. 8 shows an alternate embodiment of a gripping device, according to this invention, mounted to a horse's hoof;

DETAILED DESCRIPTION OF A PREFERRED EMBODIMENT OF THE INVENTION

Figure 9A:
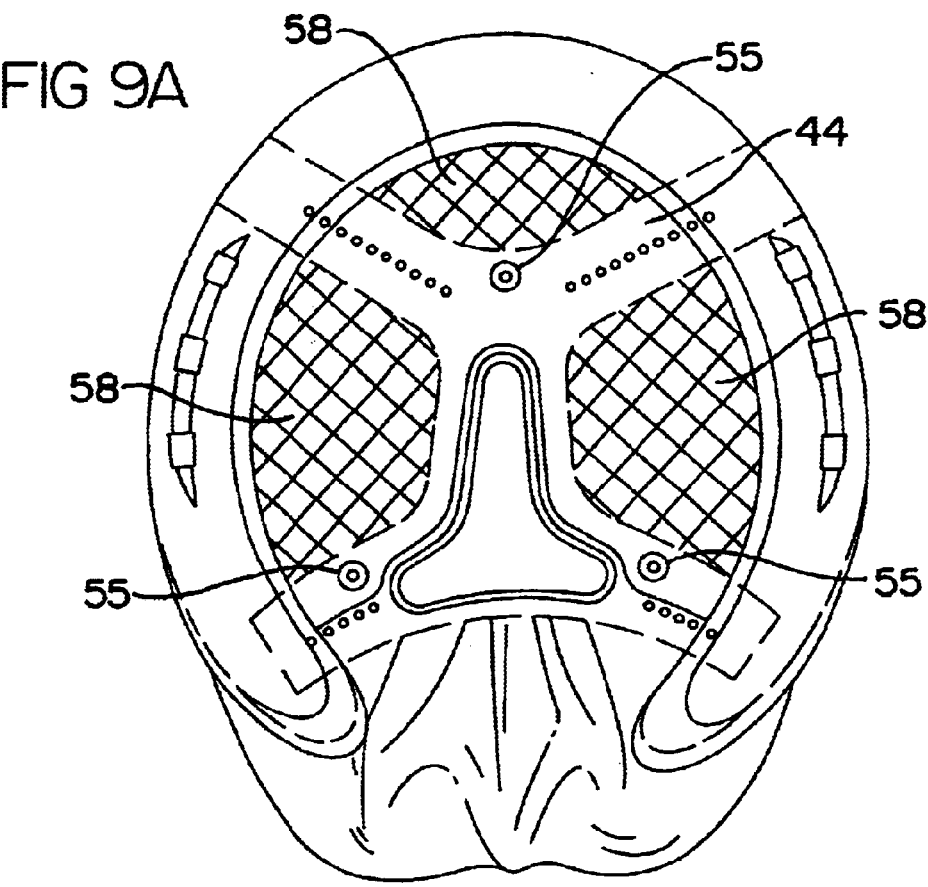
FIG. 9A is a plan view of the device hereof used in cooperation with a hospital plate, the traction device utilizing an X-shape.

As noted hereinabove, the invention is directed to a gripping device for spreading shock evenly through the device and distributing pressure over the entire surface of the horse's hoof 28 and improving the grip or traction between the hoof 28 and the contacting surface, such as a racing track, resulting in better traction for the horse, especially on a wet or muddy track or surface.

With more particularity and as shown in FIGS. 1–8, the gripping device hereof is, generally, denoted at 10 and 100 and each is, preferably, used in combination with a horseshoe 12 and adapted to be secured to the bottom surface of the horse's hoof. As shown best in FIG. 8, the gripping device 10 has an outer periphery that is substantially coextensive with and bounded by the inner wall 24 of the horseshoe. As shown best in FIGS. 6 and 7, the gripping device 100 is interposed between the horseshoe 12 and the horse's hoof 28 and has an outer periphery that is substantially coextensive with and bounded by the outer wall 26 of the horseshoe.

Referring to FIG. 8, the horseshoe 12 is generally U-shaped having a central arcuate toe portion 14, an arcuate right leg or branch portion 16 and an arcuate left leg or branch portion 18. The shoe 12 has a ground facing, substantially planar side 20, a top hoof wall or sole facing side 22, and a pair of U-shaped walls 24 and 26, the wall 24 facing inwardly and forming the interior of the horseshoe and the wall 26 facing outwardly and forming the exterior wall of the hoof. The horseshoe 12 may be made of any material suitable for horseshoes, such as iron, and is typically secured to the horse's hoof 28 by nails.

The gripping devices 10 and 100 each comprise an elastomeric pad 30 and a gripping element 32. The pad 30 of each device 10 and 100 is cut into shape, as needed, depending upon the shape of the horseshoe, from a formed pad 30', as will be described hereinbelow.

The pad 30 comprises a flat top surface 34 that faces toward the horse's hoof 28, a bottom surface 36 opposite the top surface, and an outer periphery 38. The outer periphery 38 of the gripping elements 10 and 100, respectively, approximates the shape of the horseshoe inner wall 24 and outer wall 26.

The pad 30 is comprised of a rigid yet flexible material, such as rubber, neoprene or other suitable elastomer, a polymer, high-grade polyurethane, or other durable stress resistant material. In a preferred embodiment the pad had a thickness of about 0.125 inches to 0.187 inches, a width of about 6.5 inches, and a length of about 6.75 to 7.25 inches. Depending on the physical activity the horse is involved in, the pad could be thinner or thicker, smaller or larger, thinner and smaller or thicker and larger—such as Western performance, to increase the resistance to impact forces of the horse's hoof.

The gripping or traction element 32 comprises a planar flat plate 40 that is embedded (i.e., inlaid) into the elastomeric material. Preferably, the plate 40 is either X- or T-shaped or X-shaped, of a suitable metal, and comprises an arcuate portion 42, a rectangular portion 44, and a generally curvilinear raised portion or section 46 formed centrally of the plate portions 42 and 44. Preferably and for reasons that will be described hereinbelow, a plurality of apertures 49 are provided in the plate portions 42 and 44.

The raised section 46 comprises a continuous wall 47 and, generally, defines the outline of a "T". The raised section 46 defines a T-shaped opening 48 that cooperates to bond to the pad material. Preferably, the raised section 46 is integral with the plate 40 and projects upwardly therefrom to provide traction.

Additional details of the gripping element 32 are discussed in the above-mentioned U.S. Pat. No. 5,636,695 and will not be discussed further.

Referring to FIGS. 1–6, in a method of manufacture of the gripping element 100, the preformed metal plate 40 is positioned in a suitable mold (not shown). An amount of rubber, neoprene or suitable polymeric or elastomeric material is poured or otherwise introduced into the mold and about the plate 40 whereby to embed the arcuate and rectangular portions 42 and 44 of the plate 40 in the material and at a location between the top and bottom surfaces 34 and 36.

As shown in FIGS. 1 and 2, the elastomeric material forms a pad 30'.

As shown in FIG. 2, the raised section 46 is partially embedded in the elastomeric material and projects upwardly from the bottom surface 36. Additionally, a portion of the material may be introduced into the T-shaped opening 48 of the raised portion 46 to help bond or secure the plate 40 to the material.

Although the above discussion contemplates that the gripping element 40 is preformed and supplied separately, it is to be understood that the raised section 46 can be integrally molded as part of the pad 30'. Additionally, although the raised section 46 is illustrated as being generally T-shaped, it is to be understood that the shape could be other (e.g., X-shaped or Y-shaped). Further, an array of ribs or cleat like members could be provided.

Depending on the application, the plate portions 42 and 44 could be stamped and formed from a metal plate to provide any desired shape and gripping element 46 of desired height, or otherwise formed by methods known by those in the metal forming art.

Further, if desired, rivets 50 through the inlaid metal plate 40 can be provided for additional strength. In this regard, an array of apertures are provided in the metal plate portions 42 and 44. During formation of the pad, the elastomeric material will fill the apertures and form a rivet-like interconnection therebetween. The rivets will result in the metal plate 40 being further intersecured within and to the elastomer.

In the method, referring now to FIG. 3, the pad 30' is positioned such that the heels of the horseshoe are resting above the inlaid metal plate 40. The heels may be positioned up to about one-half inch past the plate 40, or as required. A line is traced on the elastomeric material about the outside of the horseshoe.

In FIG. 4, the trace outline on the pad 30' is cut, removing the material "A", being careful to cut around the inlaid metal plate. The pad material "B" is then removed from the top and the bottom of the metal plate.

In FIG. 5, excess metal 42' and 44' is cut-off from the plate portions 42 and 44, such as with a belt sander or hand grinder, or the like, and any metal remaining ground down to remove any sharp edges. This provides the gripping element 100.

Turning to FIGS. 6 and 7, the gripping device 100 is shown mounted to the bottom surface of the horse's hoof.

The pad 30 of the gripping device 100 may be attached to the horse's hoof by any suitable means, such as by nails. Preferably, and as shown, the pad 30 is configured to substantially overlie the frog of the horse's foot. The pad 30 with its inlaid plate 40 and traction element 46 provides stimulation of the vascular system and hence is an aid to blood circulation, when used in conjunction with hoof impression material.

In the method of manufacturing the gripping device 10, the horseshoe 12 is positioned onto the pad 30' and a line, similar to that shown in FIG. 3, is traced about the inside of the horseshoe, the excess pad material is removed, and any exposed end portion of the metal plate ground so as to be free of sharp edges. This provides the gripping element 10 having the desired outer periphery.

Turning to FIG. 8, the gripping element 10 is shown therein as being positioned within or bounded by or traversing the spaces between the branches of the horseshoe 12 and secured to the horse's hoof The apex 52, frog 54, and buttress 56 of the frog are shown relative to the horseshoe 12 and the gripping element 10.

The pad 30 of the gripping element 10 may be attached to the horse's hoof along its outer periphery by any suitable means, such as by nails or glue. Preferably, and as shown, the pad 30 is configured to substantially overlie the frog of the horse's foot for the same reasons stated regarding the gripping device 100.

Several distinct advantages are thus seen as being provided by the gripping device 10 and 100.

Desirably there is provided herein a device that aids traction protection and therapeutic shoeing applications.

The gripping device of the present invention improves traction between the horse's hoof and the ground and spreads the shock evenly and distributes pressure over the entire surface of the horse's hoof.

The arcuate portion 42 when positioned in relation to the heels of the horseshoe, offers frog support at the buttress of the frog in a manner similar to straight bar shoes. This is achieved by filling the void between the gripping device and the frog with the desired elastomeric support material.

The rectangular portion 44, which stems from the toe and up to the arcuate portion 42, offers support to the center area of the hoof like a traditional heart bar shoe. This feature when combined with the desired elastomeric support material supports the apex of the frog and the sole of the hoof.

The rectangular portion 44 offers support to the sole of the horse's hoof when the void area of the sole and the gripping device are filled with the desired elastomeric material.

Frog stimulation occurs via earth material packing into the open area 48 of traction portion 46, applying equal pressure against the elastomeric material which covers the hoof side of the gripping device and essentially the T-shaped opening of the gripping element. When the gripping element is positioned correctly to the buttress and apex of the frog, the gripping device design allows the elastomeric material to flex, distributing even frog pressure, stimulating that of which the hoof on ground surface would have. Ultimately, stimulating circulation in the hoof promotes healing of the sore-footed horse.

The light weight and strength of the gripping device allows any style of shoe to be applied to the injured hoof, minimizing added weight to the hoof capsule. A traditional straight bar or heart bar shoe would add more weight to the hoof and hoof capsule. The traction device 46 positioned between the heels of the shoe offers traction and supporting qualities whereas therapeutic shoes are heavy and flat which promote slippage.

Figure 9C:
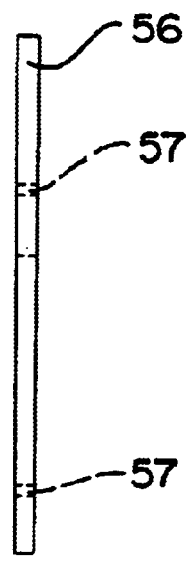
FIG. 9C is a side view of the hospital plate.
Figure 9B:
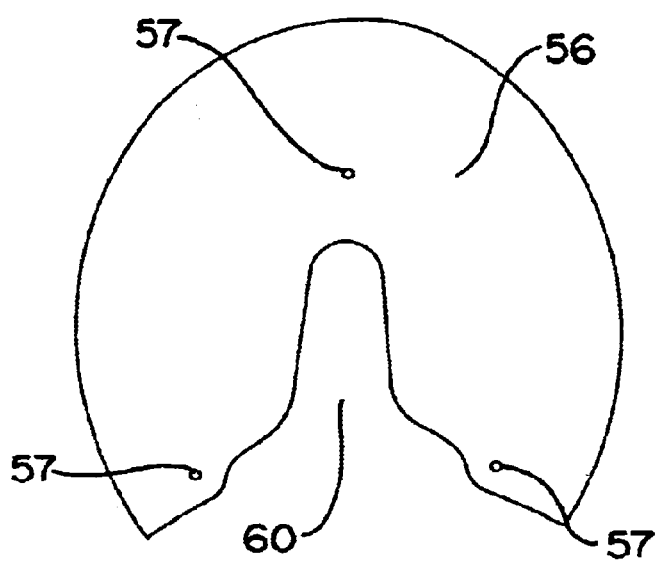
FIG. 9B is a plan view of the hospital plate.

Referring now to FIGS. 9A, 9B and 9C, there is depicted a further embodiment of the present invention. In accordance with this embodiment, the pad hereof is used conjointly with a hospital plate 56. By the term "hospital plate" is meant a pad or plate which overlies an injured hoof and through which there is access to the wound of the horse.

The hospital plate 56 hereof is used with and is complementary to the pad 30. The plate 56 is formed from a hard elastomeric material or aluminum having a thickness, preferably, of about ⅛". The plate 56 can be made of a universal size or for an individual size. As shown in FIG. 9B, the plate is a substantially planar member having a curvilinear edge which is complimentary to the interior of a horseshoe. The plate 56 has a plurality of apertures or threadholes 57 which are intended to or which cooperate and register with openings 55 formed in the portion 44. Threaded fasteners, such as screws (not shown) project through the registering apertures 57 and 55 to secure the plate to the pad.

The plate 56 includes a cutout portion 60 which is complementary to the traction portion 46 and encircles the traction portion, as shown.

In practicing this embodiment, and as shown in FIG. 9A, the elastomeric pad 30 is cut out or is provided with a plurality of cut out portions 58. By providing the cut out portion or portions 58, the injured portion of the hoof is free of the pad and, therefore, no touching occurs therebetween to thus prevent irritation thereto.

It is to be appreciated that the hospital plate is, essentially, insertible into the cut out areas.

By cutting out the material of the pad, this exposes the hoof sole surface thus allowing a farrier or veterinarian to gain access to an abscess, puncture, wound or the like, to apply the requisite medicine or treatment. The hospital plate 56, then overlies and covers the injury and is secured to the pad via the threaded fasteners.

Although various embodiments of the invention have been disclosed for illustrative purposes, it is understood that variations and modifications can be made by one skilled in the art without departing from the spirit of the invention.

Having thus described the invention, what is claimed is:

1. A gripping device for a horse's hoof, the device comprising:

a generally planar shock absorbing pad adapted to spread the shock evenly upon striking the contacting surface and taking pressure off the wall of the hoof, and a gripping element for improving the grip between a horse's hoof and the contacting surface, the pad having a top surface adapted to face towards and overlie the frog and central portions of a horse's hoof, a bottom surface opposite the top surface and an outer periphery, the gripping member having a plate portion and a raised portion extending upwardly from the plate portion, and the plate portion being disposed interiorly of the pad, and the raised portion being positioned centrally of the shock absorbing pad wherein to overlie the frog portion and projecting in part above the bottom surface.

2. The gripping device of claim 1, wherein the pad has a preselected size to fit within and be bounded within an interior wall of a horseshoe.

3. The gripping device of claim 1, wherein the pad has an outer periphery that is substantially coextensive with the exterior wall of a horseshoe, said pad being disposed between the horse's hoof and the horseshoe when the horseshoe is mounted to the horse's hoof.

4. A shock absorbing pad adapted for attachment to the bottom surface of a hoof of a horse, comprising:

a body portion comprising a durable, resilient material substantially conforming to the shape of said bottom surface, said body portion having an upper and a lower surface, forward and rearward end portions, and an outer periphery, wherein said upper surface of said body portion is dimensioned to cover substantially all of said bottom surface, and a gripping element extending upwardly from the lower surface of said body portion, said gripping element being proximal to the rearward end portion of said pad whereby to overlie the frog and central portions of the horse's hoof when said pad is attached to the bottom surface of said hoof.

5. The shock absorbing pad as claimed in claim 4, wherein said gripping element is integrally formed with said body portion.

6. The shock absorbing pad as claimed in claim 4, further comprising a gripping plate, said gripping plate being embedded interiorly of said body portion and including said gripping element, said gripping element rising from said gripping plate and extending, at least in part, upwardly from the body portion.

7. The shock absorbing pad as claimed in claim 6, wherein said body portion is adapted to be sandwiched between the bottom surface of said hoof and a U-shaped horseshoe when mounted to the horse's hoof, and further comprising fastening means for fastening the outer periphery of said body portion to said hoof, the outer periphery being about the same size and shape as the exterior of said horseshoe.

8. The shock absorbing pad as claimed in claim 7, wherein the pad is comprised of rubber.

9. The shock absorbing pad as claimed in claim 6, wherein said body portion is capable of covering the bottom surface of said hoof disposed within a U-shaped horseshoe when mounted to the hoof, and further wherein said body portion conforms to the interior shape of the horseshoe, said pad being smaller than the interior shape of the horseshoe.

10. The shock absorbing pad as claimed in claim 6, wherein said body portion is adapted to be sandwiched between the bottom surface of said hoof and a U-shaped horseshoe when mounted to the horse's hoof, and further wherein said body portion conforms to the exterior shape of the horseshoe, said pad being greater than the interior shape of the horseshoe.

11. The shock absorbing pad as claimed in claim 4, wherein said body portion is a rubber body portion.

12. A shock absorbing pad adapted for attachment to the bottom surface of the hoof of a horse and adjacent to a horseshoe, said pad comprising a body portion formed of an elastomeric material, said body portion being circumposed by the horseshoe and being substantially the same size and shape as the bottom surface of said hoof so that said body portion covers substantially all of said bottom surface of said hoof, and a stiffening plate embedded in said body portion and having a gripping section extending upwardly and outwardly from said body portion and away from said hoof when the pad is attached to the bottom surface of said hoof said gripping section overlying the frog and central portions of the horse's hoof when said pad is attached to the bottom surface of said hoof.

13. The shock absorbing pad as claimed in claim 12, further comprising a gripping plate embedded within said body portion, said gripping plate including said gripping section, and fastening means for fastening said pad to the hoof of said horse.

14. A shock absorbing pad adapted for attachment to the bottom surface of the hoof of a horse and adjacent to a horseshoe, said horseshoe defining generally U-shaped inner and outer walls, said pad comprising a body portion formed of an elastomeric material, said body portion having an outer periphery that is substantially coextensive with and spaced inwardly from the inner wall of the horseshoe and upper and lower mating faces, each mating face being about the same size and shape as the bottom surface of said hoof so that the upper mating face of said body portion is capable of covering said bottom surface of said hoof and the lower mating face is capable of engaging the top mounting surface of the horseshoe, and a gripping section extending upwardly and outwardly from the lower mating face of said body portion, said gripping section being positioned centrally of said body portion whereby to overlie the frog portion of the horse's hoof when the pad is attached to the bottom surface of said hoof.

15. The shock absorbing pad as claimed in claim 14, further comprising a gripping plate embedded within said body portion, said gripping plate including said gripping section, and fastening means for fastening said pad to the hoof of said horse.

16. A method of making a shock absorbing pad adapted for attachment to the bottom surface of a horse's hoof, the steps of the method comprising:

forming a gripping element from a metal plate, said step of forming said gripping element comprising deforming the sheet of metal at a central location thereof with the deformed portions of the sheet extending upwardly to define a raised T-shaped section and a T-shaped opening centrally of said plate, and embedding said gripping element in a body of elastomeric shock absorbing material, said body including a top surface adapted to cover the bottom surface of the horse's hoof and a lower surface, said step of embedding includes introducing a portion of the elastomeric material into the T-shaped opening to interlock the gripping element in the body of elastomeric shock absorbing material, and wherein said raised T-shaped section extends in part above the lower surface.

17. The method of making a shock absorbing pad as claimed in claim 16, wherein the steps of the method further comprise:

positioning a horseshoe onto the lower surface of the body of elastomeric material, said positioning orienting the horseshoe about the gripping element, tracing an outline of the horseshoe's shape onto the lower surface, and removing the material outside of the line representing the shape of the horseshoe.

18. The method of making a shock absorbing pad as claimed in claim 17, wherein the horseshoe is generally U-shaped and includes an outer wall and an inner wall, and said step of tracing comprises tracing the shape of the inner wall onto said pad.

19. The method of making a shock absorbing pad as claimed in claim 17, wherein the horseshoe is generally U-shaped and includes an outer wall and an inner wall, and said step of tracing comprises tracing the shape of the outer wall onto said pad.

20. The method of making a shock absorbing pad as claimed in claim 16, wherein the steps of the method further comprise:

prov018ing the sheet of metal with a plurality of apertures, and said step of embedding further includes introducing elastomeric material into the apertures to further interlock the gripping element to the elastomeric material.

21. In combination, a horse's hoof having a bottom surface, the bottom surface of the foot being, in part, a frog portion, a generally planar shock absorbing pad of elastomeric material, said pad having upper and lower surfaces, a generally U-shaped outer periphery, and a traction element embedded, at least in part, in said elastomeric material, said upper surface covering said bottom surface, and said traction element extending upwardly from said lower surface and away from said hoof, said traction element being juxtaposed, at least in part, above said frog, and a horseshoe having generally U-shaped outer and inner walls, and generally parallel first and second surfaces, and wherein said first surface is in juxtaposition with said lower surface, and the U-shaped outer periphery of said pad is juxtaposed with the U-shaped inner wall of the horseshoe.

22. The combination as claimed in claim 21, further comprising means for securing the horseshoe and pad to the hoof, and said pad having an outer periphery that is substantially coextensive with the outer wall of the horseshoe.

23. In combination, a shock absorbing pad adapted for attachment to the bottom surface of the hoof of a horse and adjacent to a horseshoe, said pad comprising a body portion formed of an elastomeric material, said body portion being circumposed by the horseshoe and about the same size and shape as the bottom surface of said hoof so that said body portion covers said bottom surface of said hoof, and a gripping section extending upwardly from said body portion, said pad having at least one cut out portion for exposing an injury to the hoof, and a hospital plate overlying said pad and secured thereto, said plate being complementarily formed to the pad.

* * * * *